L. PONDELICK.
SELF ADJUSTING PISTON RING.
APPLICATION FILED FEB. 6, 1914.
1,265,109.
Patented May 7, 1918.
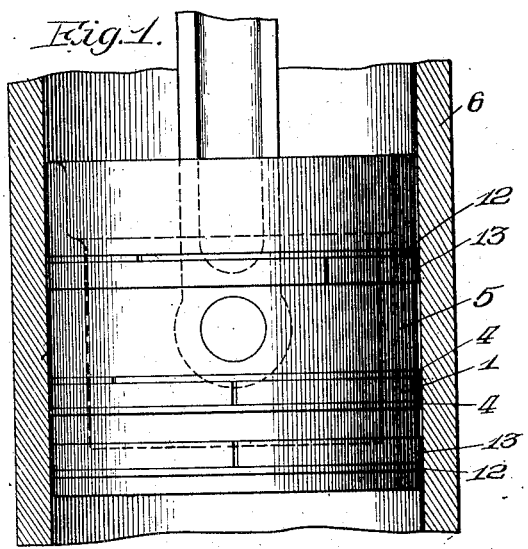
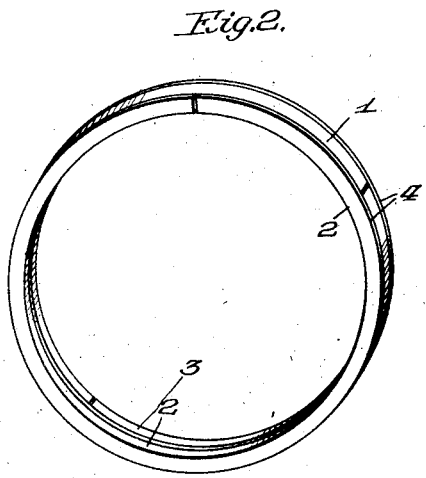
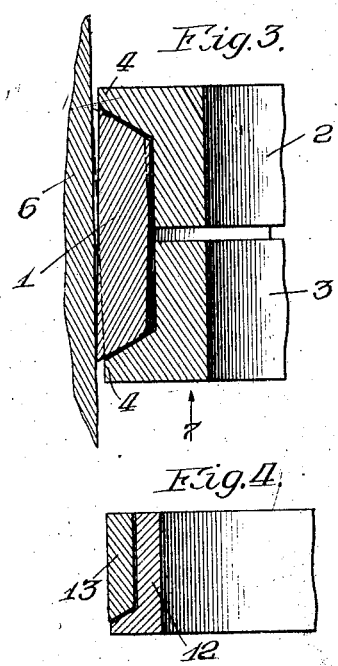
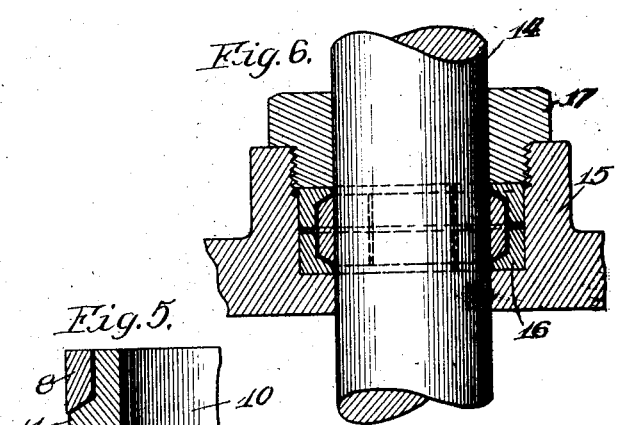
Witnesses:
R. L. Farrington
M. M. Boyle
Inventor
Leo Pondelick
By Lotz + Schilli Attys.

UNITED STATES PATENT OFFICE.

LEO PONDELICK, OF CHICAGO, ILLINOIS.

SELF-ADJUSTING PISTON-RING.

1,265,109.  Specification of Letters Patent.  Patented May 7, 1918.

Application filed February 16, 1914. Serial No. 818,962.

*To all whom it may concern:*

Be it known that I, LEO PONDELICK, citizen of the United States, residing at Chicago, in the county of Cook and State of Illinois, have invented certain new and useful Improvements in Self-Adjusting Piston-Rings; and I do hereby declare the following to be a full, clear, and exact description of the invention, such as will enable others skilled in the art to which it appertains to make and use the same.

My invention relates to metallic packing rings and more particularly to rings suitable for use in securing tight joints between pistons and the cylinders housing the same, or between piston rods or valve stems and the cylinder heads or other wall portions through which the said rods or stems are slidable when in action. In mechanism of this kind, it has heretofore been customary to use split rings and to depend upon their resiliency for insuring the desired sliding fit, in which case the closures actually obtained varied as the resiliency of the rings decreased with the stresses upon the metal. Besides, with annular rings used for this purpose, the outward pressure due to their resiliency was generally distributed equally throughout the faces, so that a piston-packing ring of this kind would bear tangentially against the wall of the cylinder and if it encountered any solid particle upon the said wall, it would be apt to push this particle before it and gouge the bore of the cylinder with the same. Moreover, such a bearing of the packing ring against the wall of the cylinder throughout the edge of the ring was apt to create an amount of friction which is undesirable in practice, and has often led to an unnecessary amount of wear on both the packing ring and the cylinder.

One object of my invention is to provide a packing ring which will not be dependent to any large extent upon its resiliency for the effectiveness of the closure provided by the said ring, but in which the longitudinal thrust upon the piston will coact with the ring to expand the latter so as to produce the desired closure, and in which the tightness of the closure will increase with the pressure or longitudinal thrust upon the ring. Another object is to provide a packing ring so designed as to bear relatively lightly at its forward edge against the wall of the member with which it has sliding engagement, so that the said ring may ride over any roughness or foreign objects encountered thereby instead of forcing such objects to gouge into the metal member with respect to which the ring is slidable. Still another object is to provide a packing ring in which the motion-effecting thrust will cause a relatively tight and loose interfitting of the respective edges of the ring according as the thrust is in the one or the other direction. I accomplish these objects by the construction shown in the accompanying drawings in which:

Figure —1— is a fragmentary section of a piston equipped with two different embodiments of my invention.

Fig. —2— is a perspective view of the packing ring embodying my invention.

Fig. —3— is an enlarged fragmentary section of the ring of Fig. —2—.

Figs. —4— and —5— are fragmentary sections with alternative forms of my packings rings as made for use upon pistons.

Fig. —6— is a fragmentary section through a piston rod and a stuffing box therefor equipped with my invention.

Where the packing ring of my invention is to be used upon the exterior of pistons, the ring of my invention consists of a plurality of split annular members, at least two of which are circumferentially overlapped and are equipped with substantially conical formations engaging each other longitudinally of the axis of the rings. For example, the packing ring of Figs. —2— and —3— consists of a main ring 1 having both sides disposed substantially conically about the axis of the ring, the said ring 1 circumferentially overlapping and normally carrying the cylindrical portions of auxiliary rings 2 and 3, each of which auxiliary rings has a flange 4 extending radially outward thereof and shaped to conform substantially to the conical configuration of one of the sides of the main ring 1. In practice the composite packing ring consisting of the adjoined parts 1, 2 and 3, is mounted upon a piston 5, as shown in Fig. —1—, with the inner surfaces of the auxiliary rings 2 and 3 bearing against an inner drum, the size of which drum will limit the contraction of the split rings 2 and 3. The main ring 1 is preferably of an outside diameter substantially equal to, or slightly smaller than, the bore of the cylinder 6 in which the piston 5 reciprocates when in use, this main ring being preferably of a flexible and somewhat resilient material. When the parts comprising the packing ring are adjoined, as in Figs. —2— and —3—, a thrust upon the piston in the direction of the arrow 7 will cause the conical flange 4 of the auxiliary ring 3 to engage the adjacent conically shaped side or flange of the main ring 1, in doing which the said conical portions will coact as cam surfaces to force the lower edge of the main ring 1 outwardly, or in other words, to expand this edge of the ring 1 circumferentially. However, when the thrust is in the said direction the corresponding action at the other edge of the main ring 1 will not be sufficient to also forcibly expand this end, hence the peripheral edge of the main ring 1 will be disposed slightly angularly with respect to the adjacent walls of the cylinder 6, thereby pressing the lower edge of the ring 1 into forcible engagement with the said wall although leaving the upper edge of the said ring free to ride over any irregularities in the surface of the said wall or impurities encountered thereupon. However, when the direction of thrust is reversed, the outward web upon the member 2 will coact with the conical upper edge of the main member 1 to expand this part outwardly while the resiliency of the main ring 1 will draw the lower part of the said ring radially inward so that the outer part of the ring will assume the position shown in dotted lines in Fig. —3—. Thus it will be evident that with each reversal of the direction in which the piston is moved, the ring will adjust itself so as to glide freely over obstructions and so as to present a tight closure at the edge from which the pressure comes, that is to say, the edge at which the gas pressure or steam pressure is applied.

Instead of equipping the main ring member 1 with edge formations sloping conically inward from the said edges, the main ring portion may be made in two sections 8 and 9 disposed outwardly of a single auxiliary ring portion 10, as shown in Fig. —5—, in which case the opposed edges of the main ring members 8 and 9 are conically bored and bear against the opposite sides of a tapering ring formation 11 disposed upon the outer surface of the auxiliary ring 10.

Where the packing ring of my invention is to be used upon pistons subjected to a severe thrust in only one direction and returned by the operating mechanism with the corresponding thrust in the opposite direction, the construction may be simplified by using a single auxiliary ring 12 in combination with a single main ring 13, as shown in Fig. —4—. The same simplified construction may also be applied to double-acting pistons by applying the same in opposite directions at the respective ends of the piston, as shown in Fig. —1—.

While I have described my packing rings as applied to pistons in which the rings are expanded radially outward to effect the tight closure and are returned radially inwardly by their own resiliency, it will be obvious that the same principles of construction may be applied to packings in which the action is reversed. For example, Fig. —6— shows a piston rod 14 slidably mounted in a cylinder head 15, in which a packing ring 16 is secured by a stuffing nut 17. In this case it will be obvious that by reversing the arrangement of Fig. —3—, the thrust upon the respective ring members will tend to tilt the forward edge of the packing ring outwardly and that the thrust upon the packing ring will tend to force the main ring member inwardly against the rod or stem 14, while the resiliency of the said ring member will expand the same radially or circumferentially upon a relaxing of the said thrust. It will also be obvious that while I have shown my invention in embodiments having certain arrangements and shapes of parts, these might be varied in many ways without departing from the spirit of my invention as covered by the appended claims.

I claim as my invention:

1. The combination with a cylindrical bore and a grooved element fitting the same, of a piston ring comprising a plurality of parts disposed in said groove, one of said parts being housed by the remainder thereof, the housed part consisting of a split ring having beveled convergent end surfaces, the housing portion comprising a pair of relatively non-contacting split rings having annular flanges presenting opposed beveled faces between which the housed part is engaged, the beveled faces of said flanges substantially parallel with and opposing the beveled ends of the housed part, said opposed beveled faces adapted to cause the said members to alter their relative diameters upon a thrust upon one of the members longitudinally of the axis of the bore, the resiliency of the said members serving to return the same to their normal relative diameters upon a cessation of said thrust.

2. In combination with a cylinder and a grooved piston, a packing ring including an outer split ring engaging the bore of the cylinder and having its edges disposed substantially conically about the axis of the cylinder; and a pair of inner elastic split rings slidably engaging the piston and equipped with relatively non-contacting portions housed by the said outer ring and normally carrying the latter, said inner rings equipped with conical faces opposed to and corresponding to the said faces of the outer ring; the conical disposition of the said opposed faces causing the said outer split ring to alter its diameter at one or the other end thereof upon a thrust on one or the other of the inner rings in a direction substantially longitudinally of the said axis, each of said split rings presenting toward one end of the groove of the piston a face parallel to said end and in a plane normal to the axis of the piston, thereby causing a longitudinal movement of the piston to exert a similarly longitudinal thrust upon one or the other of said split rings, according to the direction of said movement.

3. Piston packing for a piston having a diametrically contracted cylindrical portion bordered by annular ends presenting faces in planes at right angles to the axis of the piston, comprising a pair of equivalent elastic split rings each presenting an enlarged end portion with a face parallel and adjacent to one of the aforesaid faces of the piston, and each having its said enlarged portion connected to a reduced and exteriorly cylindrical portion by a frusto-conical portion of the said split rings, the latter having a total length less than that of the said contracted portion of the piston, and an overlapping split ring within said reduced portion having conical edges corresponding to and adapted to contact with said frusto-conical portions.

In testimony whereof I have signed my name in presence of two subscribing witnesses.

LEO PONDELICK.

Witnesses:
ALBERT SCHEIBLE,
M. M. BOYLE.